United States Patent [19]
Troy

[11] 3,762,691
[45] Oct. 2, 1973

[54] NONPLUGGING MATERIAL FEED SYSTEM

[75] Inventor: Elbert C. Troy, Highland Park, Ill.

[73] Assignee: National Engineering Company, Chicago, Ill.

[22] Filed: June 30, 1972

[21] Appl. No.: 268,152

[52] U.S. Cl.................. 259/151, 222/193, 259/164
[51] Int. Cl............................................... B28c 5/06
[58] Field of Search.................. 259/151, 147, 164, 259/165, 168, 161, 162, 178, 179, 154; 241/33, 34, 36; 222/70, 148, 193, 195

[56] References Cited
UNITED STATES PATENTS

| | | | |
|---|---|---|---|
| 3,204,302 | 9/1965 | McIlvaine | 259/147 |
| 3,237,805 | 3/1966 | Stogner | 259/151 |
| 3,339,899 | 9/1967 | Kauffman | 259/151 |
| 3,348,819 | 10/1967 | McIlvaine | 259/151 |

Primary Examiner—Robert W. Jenkins
Attorney—Richard D. Mason et al.

[57] ABSTRACT

A system for transporting solid particulate materials and the like at metered flow rates from a source of supply to a material using apparatus at a remote location comprises metering means for feeding the material from said source at a selected flow rate, a receiver for containing the material discharged by said metering means including an outlet, elongated transport conduit means interconnecting said outlet and said using apparatus for containing a fluidized material flow, air injector means for moving the material from the receiver into and through said conduit means to said using apparatus, control means responsive to the operative condition of said using apparatus for maintaining said air injector means in operation for a selected time period after said apparatus is rendered inoperative for purging said receiver and conduit means of remaining material therein.

14 Claims, 6 Drawing Figures

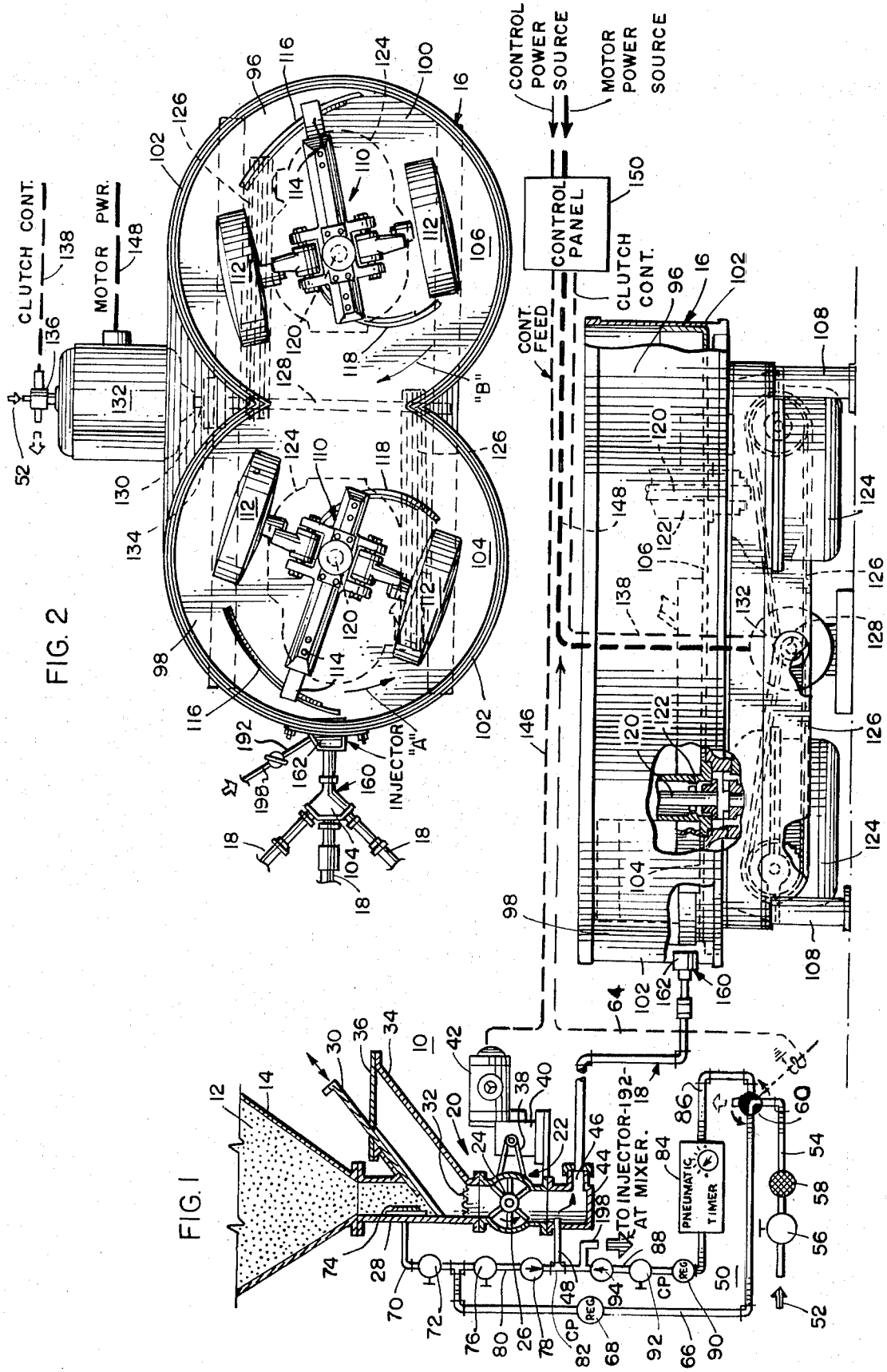

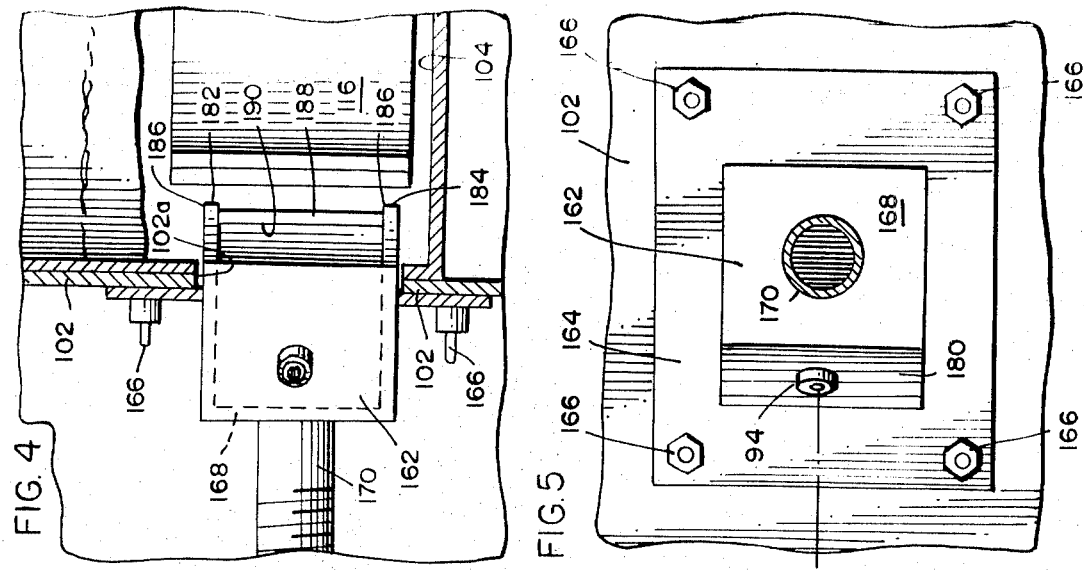
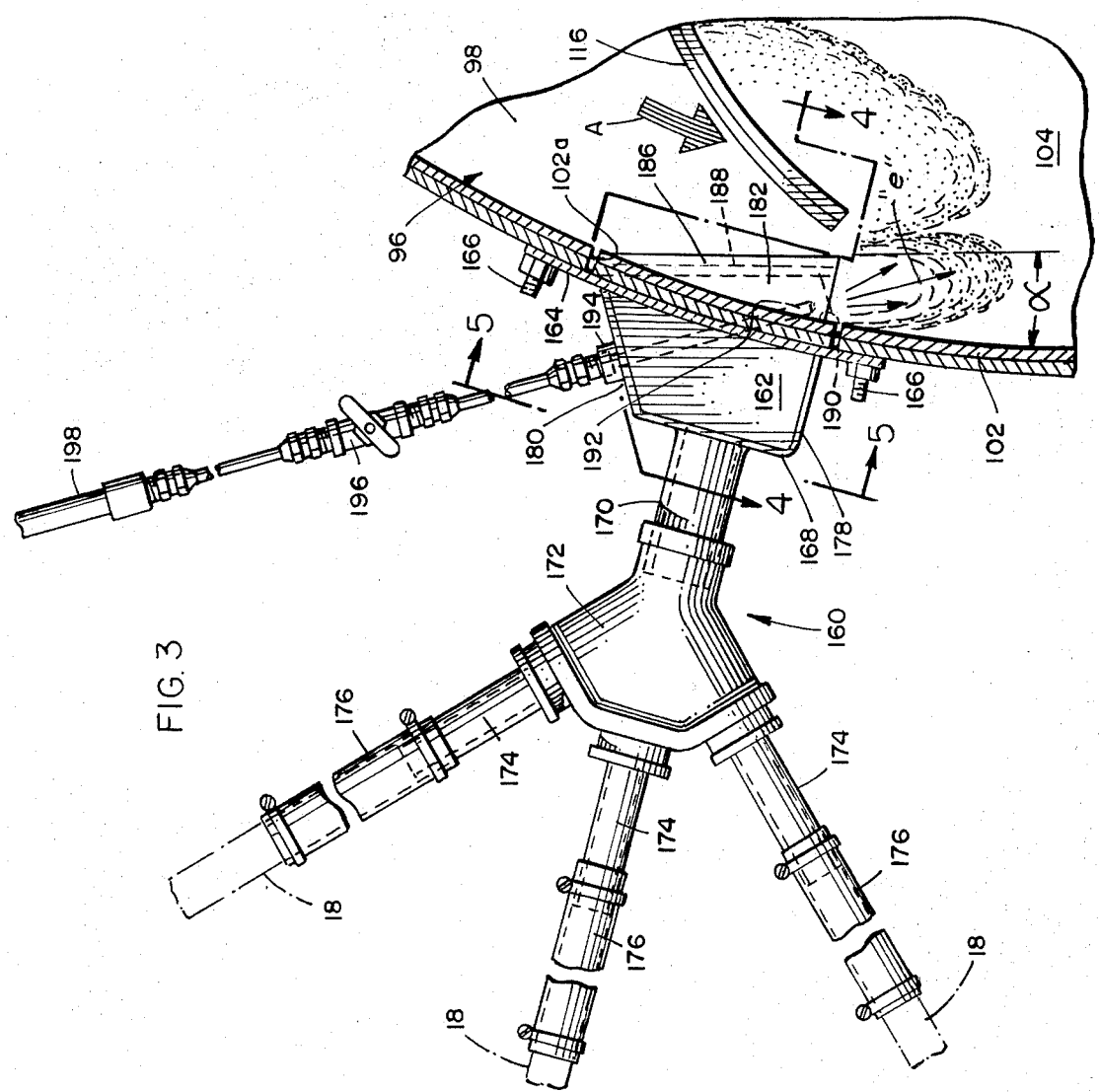

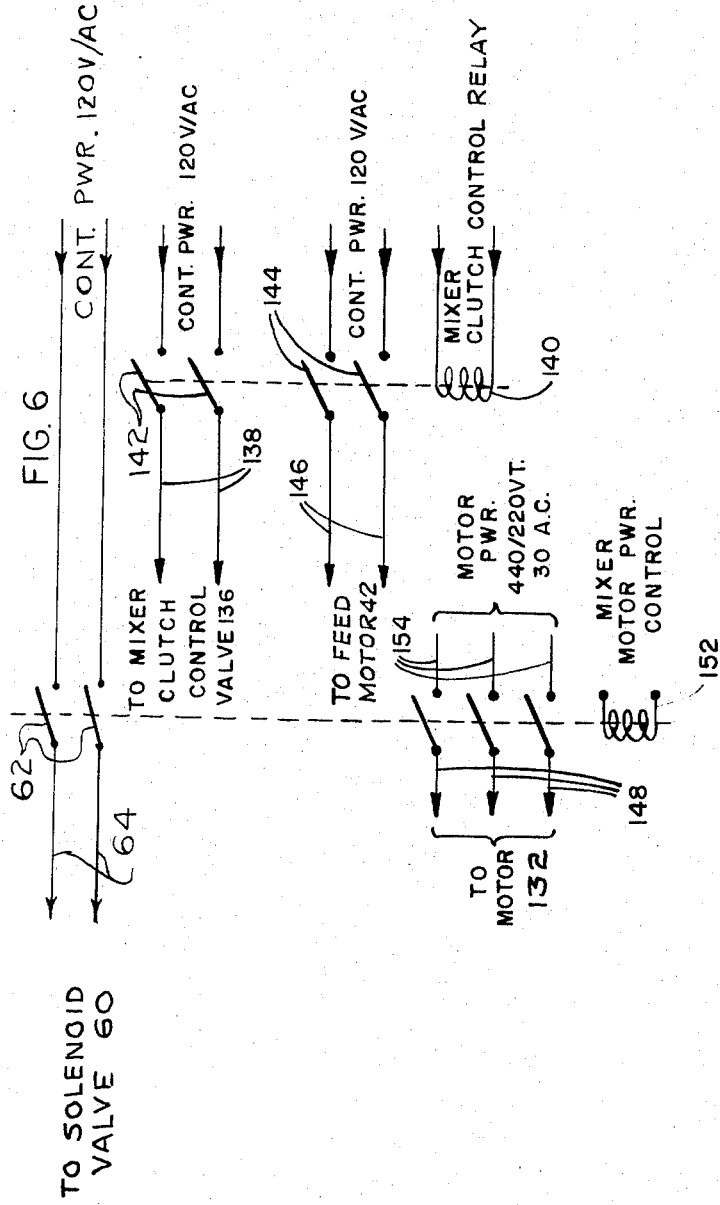

NONPLUGGING MATERIAL FEED SYSTEM

The present invention relates to a new and improved system for transporting solid particulate materials from a source of supply to a material using apparatus such as a mixer or blender positioned at a remote location. More particularly, the present invention relates to a new and improved material feeding system wherein a metered flow rate of solid particulate material is transported for considerable distances in a fluidized state for injection into a mixer or other type of material using apparatus. When most types of solid particulate materials are transported pneumatically in conduits of extensive length and of relatively small cross sectional flow area, if the flow is interrupted for any reason the material settles in the conduit and other parts of the system and is difficult to remove when the system is restarted. When the material settles it tends to compact and plug up the conduit system and oftentimes is extremely difficult to remove without completely dismantling and cleaning out the mechanism. Some materials are more difficult to remove and clean out than others and in some instances it is necessary to completely dismantle the conduit system even if the flow is interrupted only momentarily in order to get the system restarted in the material feeding operation.

It is an object of the present invention to provide a new and improved pneumatic transport system for moving solid particulate material to a remote location in a manner which eliminates the foregoing mentioned difficulties with prior art systems.

Another object of the present invention is to provide a new and improved pneumatic system of the character described which is readily adjustable to provide a desired metered flow rate of material.

Still another object of the invention is to provide a new and improved pneumatic transport system of the character described wherein the transport conduit is automatically purged of material should the normal flow of material through the system be interrupted even if only momentarily.

Another object of the present invention is to provide a fail safe transport system of the character described wherein the transport conduit is automatically purged of material upon stoppage of the using apparatus caused by electric failure or other types of flow stoppage causes.

Another object of the present invention is to provide a new and improved transport system of the character described wherein an adjustable purge timer is provided for insuring that the conduit system is adequately purged of material upon the interruption of a normal material flow.

Another object of the present invention is to provide a new and improved system of the character described wherein a purge timer is pneumatically operated and is independent of a requirement for electrical power.

Another object of the present invention is to provide a new and improved transport system of the character described wherein an adjustable pneumatic purge timer can be adjusted to any selected time interval for purging the system as may be required by the particular conduit, materials or other conditions obtaining.

These and other objects and advantages of the present invention are accomplished by a new and improved pneumatic system for transporting particulate materials and the like wherein the material is fed at a meter flow rate from a source of supply to a using apparatus at a remote location through a pneumatic conduit. The system comprises metering means for feeding the material from said source at a selected flow rate into a receiver including an outlet. An elongated transport conduit for containing a fluidized flow of material interconnects the receiver outlet with said material using apparatus at said remote location. Air injector means moves the material fed into the receiver through the conduit and control means, responsive to the operative condition of said using apparatus, is provided for maintaining the air injector in operation for a selected time interval should said using apparatus become inoperative and not able to continue receiving material at the normal flow rate. This continued flow of air is used for completely purging the receiver and the conduit means of material and the purging action prevents the material contained within the conduit and receiver at the time of normal flow interruption forom settling and plugging up the system.

For a better understanding of the invention reference should be had to the following detailed description, when taken in conjunction with the drawings in which:

FIG. 1 is a side elevational view in somewhat schematic form showing a pneumatic material transport system in accordance with the features of the present invention for feeding material from a supply hopper to a continuous mixer remote therefrom;

FIG. 2 is a top plan view of the mixer of FIG. 1 at the receiving end of the system illustrating a novel injector means in accordance with the invention for introducing the transported material into the mixing chamber of the mixer;

FIG. 3 is an enlarged top plan view of the material injector means of the invention;

FIG. 4 is a vertical cross sectional view taken substantially along lines 4—4 of FIG. 3;

FIG. 5 is a side elevational view of the injector system looking in the direction of arrows 5—5 of FIG. 3; and FIG. 6 is a schematic electrical diagram of an electrical control system for the material transport system of the present invention.

Referring now more particularly to the drawings, therein is illustrated a new and improved pneumatic material transport system for use in pneumatically transporting particulate materials and the like from a source of supply such as a hopper to a material using apparatus such as a mixer at a remote location. The transport system is generally indicated by the reference numeral 10 in FIG. 1 and is adapted to move solid particulate material 12 contained in a supply hopper 14 to said remotely positioned processing apparatus such as the continuous mixer 16. The material flows at a controlled rate via an elongated transport conduit 18 extending between the supply source and the mixer.

One of the major difficulties encountered in prior art pneumatic material feeding systems for solid particulate materials is the fact that if the normal flow of material is interrupted, the material settles to lower portions of the transport system and tends to compact and plug up making it difficult, if not impossible to re-establish the flow when the trouble causing the interruption has been corrected. In the past it has been necessary to provide pneumatic transport conduits in which all sections were sloped to a central cleanout location or conduits which were readily detachable into sections so that the system could be cleaned out and unplugged each time a failure of flow occurs. This necessity for dismantling and clean out caused excessive costs and time outage in many situations.

One method of combating this difficulty in the past has been to slope the conduit or transport line at an angle somewhat greater than the angle of repose of the material being used in the system, however; this solution has many drawbacks and difficulties especially if the relative locations of the source of supply of material and the using apparatus at a remote location do not provide ample elevational differences for maintaining the minimum slope angle of respose all along sections of the flow conduit.

In accordance with the present invention the system 10 eliminates the need for sloping the transport conduit at or above the angle of respose of the material being fed and in addition provides a means for preventing the compacting or plugging of material should the normal flow of material be interrupted, for example, because of stoppage of the mixer drive motor.

In accordance with the invention, solid particulate material 12 in the supply hopper 14 flows into a metering feeder generally indicated by the numeral 20, which feeder includes a volumetric rotary feed mechanism 22 having a multi-bladed rotor 24 mounted for rotation in a cylindrical housing 26 having an upper inlet end in connection with a lower end of a feed conduit 28. The feed conduit is connected at its upper end to a lower outlet opening in the supply hopper 14 and is provided with a removable shutoff gate 20 which is used during maintenance or repair to prevent the material in the hopper from continuing to flow out of the lower opening. The gate is slidably disposed in a sloping guideway provided in the conduit and after the maintenance or cleanout has been completed, the gate is removed to permit flow to resume. The feed conduit 28 is also provided with a material screen 32 for eliminating oversized particles or lumps and access to the screen for cleaning out the accumulated oversize particles is provided through an upwardly sloping cleanout chute 34 having a removable top 36.

The rotary feeder 22 is driven by a belt or chain drive 38 running from a gear reducer 40 powered by a variable speed electric motor 42. Airtight sealing between the upper and lower ends of the rotor housing 26 is provided by the continuous engagement of one or more seals along the outer edges of the rotor blades of the rotor 24 against the inside surfaces of the cylindrical section of the rotor housing. This continuous sealing action prevents a back flow of air or material which might otherwise occur because of the differential pressure between the inlet and outlet ends of the feeder housing and in one embodiment of the invention the seals were rated at a value of approximately 15 psi.

Selectively controllable, volumetric metering of material fed into the system is accomplished by varying the speed of the rotor 24 which has a given volume between each pair of adjacent blades. When the rotor is driven at a selectively controlled speed, the volumetric amount of material 12 discharged per unit time can be carefully selected and regulated to suit the flow rate required by the mixing process being carried on in the remote mixer 16. The rotor speed is adjusted by varying the speed of the motor 42 and the gear reducer 40 is selected to provide the desired ratio between the input and output shafts thereof in accordance with the available speed range of the motor. For example, flow rates ranging from as low as 0.1 cubic foot per minute for small mixers up to as high as 45 cubic feet per minute for larger installations can be achieved by proper size selection of the rotor unit; gear reduction ratio and motor speed range.

A metered flow of material 12 is discharged by the rotary feeder 22 into a receiver 44 having an outlet 46 connected to the inlet end of the elongated pneumatic transport conduit 18. The outlet end of the conduit is connected to feed the material into the mixer 16. The material delivered to the receiver by the feeder 22 is moved out through the discharge outlet 46 into the conduit 18 by means of a pneumatic injection nozzle 48. The injection nozzle is supplied with compressed air at a selected and controllable, operating pressure via a pneumatic control system generally indicated as 50 and the system is connected to a source of compressed air such as a compressor or air system commonly available in industrial plants and the like and indicated schematically by the arrow 52 in FIGS. 1 and 2.

In operation of the feed system 10 in accordance with the invention, it has been found that the air pressure supplied at the injection nozzle 48 in the receiver 44 should be adjusted to provide the desired fluidizing action to air suspend the material particles in the transport conduit and move the material through the conduit 18 with a minimum ratio of air to material. For a given type of material and a given length, diameter and configuration of the fluid conduit 18, a maximum flow rate is obtained once a critical pressure is reached and further, increases in the air pressure at the nozzle 48 do not result in an increase in the flow rate through the conduit because the material simply jams up at the entrance to the conduit or in the discharge outlet 46 of the receiver. The increased velocity caused by an increase of air pressure above the critical pressure results in the air reaching such a high velocity that the fluid runs off (figuratively speaking) and leaves the solid material behind. Accordingly, the pneumatic control system 50 of the transport system includes means for adjusting and regulating the air pressure supplied to the receiver 44 through the air injection nozzle 48.

The pneumatic control system includes an inlet conduit 54 having a shut off valve 56 and filter 58 therein connected between the source of compressed air 52 and a four-way, solenoid actuated control valve 60 shown in the energized position in FIG. 1. The solenoid of the valve 60 is electrically interconnected as shown schematically so that the solenoid is energized any time power is supplied to the drive motor of the mixer 16. Accordingly, whenever the mixer drive motor is running, fluid is supplied to the receiver 44 and flow conduit 18 via the nozzle 48. The injection nozzle 48 is supplied through a normal system supply conduit 66 having an adjustable pressure regulator 68 therein for selecting the desired operating pressure to provide a minimum air to material ratio for the desired flow rate. A branch conduit 70 having a shutoff valve 72 therein is connected to the line 66 in order to supply air to a sock type, flow agitator 74 mounted on an inside wall of the feed conduit 28 between the hopper 14 and the rotary feeder 22. The flow agitator 74 helps prevent material from bridging up or plugging in the conduit 28. The normal system supply line 66 is provided with a shutoff valve 76 and check valve 78 in a branch supply conduit 80, and the branch conduit is connected to the outer end of the air injection nozzle 48 via a tee fitting 82. During normal operation of the feed system, compressed air at the selectively controlled pressure, flows via the injector nozzle 48 and moves the material that is metered into the receiver 44 out through the transport conduit 18 into the mixer 16. If the feeder 22 is stopped or shut off, the air flow continues and maintains the material in the conduit 18 in a fluidized state so that when the feeder 22 is restarted, material will again flow into the mixer. If for any reason, however, the electrical power supplied to the drive motor of the mixer 16 is interrupted, the solenoid controlled valve 60 also is de-energized and the valve then moves to a rest or purge position. When the valve 60 moves to the purge position the normal, relatively low, operating pressure source of compressed air to the injector nozzle 48 is disconnected and, in accordance with the present invention, in order to prevent material already in the system from settling and plugging up the receiver 44, the receiver outlet 46, and the flow conduit 18 the purge system is activated. The pneumatic control system 50 includes an automatic, time controlled, relatively higher pressure, purging system adapted to flow out the system. The blast of higher pressure purging air is supplied only for a limited time interval long enough to completely purge and clean out all the material in the system from the receiver 44 to the material injector on the mixer 16 at the outer end of the transport conduit 18. This automatic purging action insures that a restart of the normal flow of material through the system 10 can be accomplished without requiring that the conduit 18 be dismantled and cleaned out, and without the necessity for unplugging any components of the system wherein slugs of material have accumulated.

The automatic, material purging system includes a pneumatic timer valve which operates independent of any electrical power requirement and which is adjustable to provide a flow of purging fluid for an adjustable time interval as selected by an operator. Compressed air from the source 52 is supplied to the inlet side of the timer valve 84 (schematically indicated in FIG. 1) via a feed conduit 86 which is connected to the solenoid controlled valve 60. When the solenoid valve is de-energized, the compressed air is now routed from the inlet conduit 54 into the purge feed conduit 86 to the pneumatic timer valve. When supplied with compressed air from the conduit 86, the timer valve operates to pass compressed air through the valve for a selected time period into an outlet conduit 88 which is connected to the opposite side of the Tee-fitting 82 on the outer end of the air injector nozzle 48. A constant pressure regulator valve 90, shutoff valve 92, and check valve 94 are provided in the conduit 88 supplying the purging air to the injector 48. The pressure of the purging air is adjusted to be higher than the normal operating pressure of the system as controlled by the adjustable constant pressure regulator 90. When the normal system is in operation, back flow into the pneumatic timer 84 is prevented by the check valve 94 and in the alternative when the purging system is in operation back flow into the normal operating branch 80 is prevented by the check valve 78. After the pneumatic timer 84 has timed out, the blast of purging air is shut off so that additional air is not wasted and the receiver 44 and conduit 18 are then at ambient air pressure. In the event of a plantwide electrical failure, overload or inadvertent shutoff of electrical power to the mixer motor, the pneumatic purge system 50 provides an automatic, purging of the receiver 44 and transport conduit 18 so that restart of normal material flow may be initiated without any requirement for dismantling of the conduits or components to unplug and clean out the same as often was required in many prior art pneumatic transport systems. Moreover the purging pressure is adjustable independently of the normal operating pressure to insure full clean out and the time interval of the purge action is adjustable to provide for a minimum wastage of air after purging is completed.

One type of air actuated, adjustable pneumatic timer valve suitable for use in the present invention is manufactured by the Ross Operating Valve Company of Detroit, Michigan and these valves are sold under the trade style "Gray Headline Series." These valves are available in a large range of operating air pressures and in a wide range of adjustable timing intervals and in one prototype system in accordance with the invention, a "Ross" air actuated, straight way valve, Model No. 2682B4008 (one-half inch, normally open type), was used, details on which are available in the 1963 "Ross" catalog pages A3, A4, and S29-S-30, incorporated herein by reference.

In accordance with the features of the present invention the automatic, fail safe, self purging, pneumatic material feed system 10 is especially well adapted for use in feeding bonding materials and other finely powdered granular materials at precisely metered flow rates into a continuous mixing process, as for example, a process for conditioning foundry sand handled in the multiple head mixing apparatus 16. The mixer 16 is of the type shown and described in U.S. Pat. No. RE 25,475, which patent is incorporated herein by reference and includes a figure "8" shaped material mixing chamber 96 having a generally cylindrically shaped inlet or charging chamber 98 at one end and a similar, cylindrically shaped outlet discharging chamber 100 in communication therewith. Sand or other basic raw material to be conditioned is first introduced into the inlet chamber 98 from a conveyor or delivery chute (not shown) and after a thorough mixing and mulling treatment is discharged from the outlet chamber 100 as described in the aforementioned patent. The mixing chamber 96 includes an upstanding side wall 102 and a pair of substantially circular bottom walls or floor plates 104 and 106 supported on legs 108. In the center of each chamber is mounted a rotary mixing head 110 driven to rotate about an upstanding central axis, and each rotary mixing head includes a pair of large, heavy muller wheels 112 adapted to knead and work the material against the bottom walls as the mixing head rotates. The mulling wheels are supported on opposite sides of the central axis of rotation of the mixing heads and traverse annular paths disposed between the central axis of rotation and the outer periphery of the chamber side wall. Each mixing head includes an outer plow assembly 114 having an outer plow member 116 adapted to move around the periphery of the chamber side wall and mix the material while directing the material inwardly away from the side wall toward the path traversed by the mulling wheels. On the opposite side, each mixing head 110 is provided with an inner plow assembly 118, and the inner plows mix and move material in the central portion of the chamber and move it outwardly toward the path traversed by the mulling wheels. The mixing heads 110 in the respective chambers 98 and 100 rotate in opposite directions as indicated by the arrows "A" and "B" (FIG. 2), and during rotation the material in the mixer 16 is continuously being kneaded and mulled by the mulling wheels as well as being turned and mixed by the inner and outer plows.

Each mixing head is driven by an upstanding drive shaft 120 supported in an annular bearing assembly 122 at the center of the respective floor plates 104 and 106, and the drive shafts are coupled to a pair of heavy duty gear reducers 124 supported from the underside of the structure of the mixing chamber floor. The gear reducers are driven via belt or chain drives 126 from a common centrally positioned drive shaft 128 and the drive shaft is coupled to the rotor shaft 130 of an electrical drive motor 132 having suitable horse power requirements by means of an air actuated clutch mechanism 134 (FIG. 2). The clutch 134 is engaged when supplied with compressed air from a compressed air source 52 through a clutch control valve 136 mounted to pass compressed air to or from the clutch through the motor shaft 130. The clutch control valve 136 is adapted to direct pressurized fluid through the motor shaft into or out of the clutch 134 to drivingly engage or disengage the shaft 128 and the motor shaft 130. When the solenoid winding of the clutch control valve 136 is energized, the valve admits compressed air from the source 52 via the shaft 130 into the clutch causing the clutch to engage and drivingly rotate the drive shaft 128. When this occurs, the mixing heads 110 in the respective inlet and outlet chambers 97 and 100 rotate in opposite directions to mix and mull the material in the chamber 96 as described in the aforementioned U.S. patent.

Electrical power to energize the clutch control valve 136 is supplied through a cable 138 (shown schematically in FIGS. 1 and 6) and a mixer clutch control relay 140 is provided to operate a pair of switches 142 for controlling power to the clutch control valve 136. The clutch control relay 140 also operates a second pair of switches 144 in a cable 146 for supplying electric power to energize the rotary feeder drive motor 42. The solenoid winding of the pneumatic control system air valve 60 (as indicated schematically in FIGS. 1 and 6) is energized at all times when the mixer motor 132 is energized to provide a continuous supply of air to the receiver 44 and fluid transport line 16. When an operator energizes the solenoid winding 140 the switches 142 and 144 are closed to supply electric power for causing engagement of the clutch 134 to drivingly rotate the mixing heads 110 and start the rotary feeder 22. The pneumatic control system 50 is already supplying air for normal operation and the material 12 fed from the supply hopper 14 by the feeder 22 is delivered to the mixing chamber 96 by action of the air injection nozzle 48 as previously described. The mixer motor 132 is usually powered by high voltage, three-phase A.C. current as indicated in FIGS. 1 and 6 and a power cable 148 is provided to supply power to the mixer motor. Means for controlling the mixer motor is provided at an operator's control panel 150 and includes a solenoid winding 152 for activating a plurality of high current switches 154 of a motor starter control to energize the motor via the power cable 148. The mixer clutch control relay winding 140 is interlocked with the mixer motor 132 so that when the mixer motor is shut down, the rotary feeder 22 also is shut down so that new material is no longer fed into the system from the hopper 14. Power to the solenoid of the control valve 60 of the pneumatic control system 50 is controlled by the winding 152 which operates a pair of switches 62 in a supply line 64. As shown in FIG. 6, if the switches 144 move to open, the rotary feeder motor 42 would be de-energized, however, air will continue to be supplied through the solenoid controlled valve 60 as long as the switches 62 are closed. If the mixer motor 132 is de-energized, the switches 62 open and the automatic, fail safe, timed purging system is set into operation as previously described so that the transport conduit 18 and the receiver 44 are purged of all material. The purging air blast is supplied at the desired pressure normally below the rating of the seals of the rotary feeder 22 and is provided for a selected time interval via the adjustable pneumatic timer valve 84. The time is set up to be ample to clean out the whole system and after the time is up the air is shut off. Upon restart of the mixer motor 132, air is again supplied through the normal system as the valve 60 is activated. Subsequent engagement of the clutch 134 causes the rotary feeder 22 to feed material from the hopper and the material feed system 10 is again put into operation or restarted after shut down or interruption of service without requiring the transport line or other components to be cleaned out because of material accumulations therein.

In accordance with the present invention the mixer 16 is provided with a new and improved solid material injection system 160 (FIGS. 3, 4 and 5) for injecting into the chamber 96 one or more different types of solid particulate material which are received at the outer end of the transport conduit 18. As indicated in FIG. 3, more than one type of material may be simultaneously injected into the chamber 96 with the injector system 160 and each type of material can be injected at a selected, metered flow rate as set up by the feed system 10 for the particular material involved.

The material injector 160 includes a generally rectangular shaped housing 162 mounted to extend into an opening 102a provided at a level below the normal level of material in the chamber 96 in the upstanding side wall 102 of the inlet mixing chamber 98. The opening 102a is generally rectangular in shape and the upper edge is spaced at a level below that of the normal operating level of material contained in the mixing chamber during a continuous mixing operation. For this reason, when material supplied by the feed system 10 is injected into the bulk of raw material (sand) already in the mixer 16, the injector takes place below the surface of the raw material which acts as a blanket or filter to prevent the new material being injected from simply passing out into the air. This is especially true when the mixing chamber 96 is exhausted under a hood or the like.

The injector housing 162 is supported on the mixer side wall by means of an annular flange plate 164 which is bolted to the side wall by suitable bolts or other fasteners 166. The housing includes an outer side wall 168 having a material inlet fitting 170 connected thereto. Metered and fluidized solid particulate materials from one or more transport conduits 18 and their associated material feeding systems 10 are injected into the inlet conduit 70 by means of a multiple branch connector fitting 172 having one or more branch inlets 174 which are adapted to be connected to the respective transport conduits 118 by suitable connector fittings such as sleeves 176. Fluidized materials passing through the transport conduits 18 are mixed together in the branch fitting 172 and then pass into the housing 162 via the material inlet conduit 170.

The housing 162 also includes a pair of vertical side walls 178 and 180 and a pair of upper and lower walls 182 and 184 having inner end portions which project into the interior of the mixing chamber 96. As best shown in FIGS. 2 and 3 the top and bottom walls 182 and 184 are somewhat trapezoidal in shape and each has an inner edge 186 which angularly intersects a tangential plane of the cylindrical side wall 102 of the inlet mixing chamber 98. The angle of intersection is designated as alpha in FIG. 3. The injector housing includes an inner deflector wall 188 which is parallel to the edges 186 of the upper and lower walls 182 and 184 for deflecting the material in the chamber riding around the periphery inwardly away from the side wall 102. This inward deflection of the material at an angle "alpha" creates an opening void or pocket in the material (designated as the area "C" in FIG. 3) beneath the upper surface thereof as the material is moved around the periphery of the mixing chamber by the outer plow member 116. The pocket thus formed in the mass of moving material by the intersection of the plow 116 moving in the direction of the arrow "A" and the deflector wall 188, provides a space or pocket for receiving the solid particulate materials that are to be injected into the mixing chamber by the one or more pneumatic material transport systems 10. Moreover, the void or pocket "C" formed beneath the upper surface of the mass of material already in the chamber permits the additional materials in transit in the fluidizing flow conduits 18 to be purged fully by the purging air should the normal material flow be interrupted for any reason as previously described.

The housing 162 is formed with an outlet opening 190 which faces generally in a direction towards the void or pocket "C" created in the material by the plow 116 and deflector wall 188. The opening 190 is defined by the lower edge of the inside portion of the top wall 182, the inside edge of the deflector wall 188, the upper edge of the bottom wall 184 and the inside surface of the side wall 178. The material feed opening is in direct communication with the pocket "C" created in he material already in the mixer so that the metered flow of additional particulate materials from the one or more transport conduits 118 has a free space to enter the mass of material being conditioned in the mixer 16. The pocket or void space "C" prevents plugging up of the material feed system at the outlet end where the material is introduced into the mixer 16 and also permits purging of the pneumatic transport system from start to finish so that each new startup after a period of shut down can be accomplished without any extensive unplugging or other maintenance being required.

In order to further insure a smooth injection of material from the feeder system 10 into the mixer through the opening 190, the material injector 160 includes an air lance having an elongated nozzle 192 aligned with its outlet centered adjacent to the opening 190. The lance nozzle is angularly arrayed to approximately bisect the angle "alpha" between the deflection wall 188 and a plane tangent to the mixer side wall 102. The air lance 192 nozzle structure is secured and supported from the rear side wall 180 of the injector housing on a collar 194 and the air lance is provided with an adjustable needle valve 196 for use in adjusting the flow rate of air as well as for shutting off the air flow completely when such is not desired or required. Air is supplied to the lance through an air line 198 connected to the conduit which supplies the air injector nozzle 48 mounted in the receiver 44 of the transport system. Thus, the air injector nozzle 48 in the receiver 44 is on the inlet side of the system to initially move the material through the transport conduit 118 in a fluidized state and at the same time air is supplied via the conduit 198 to the air lance 192 at the exit side of the system at the material injector 160 to insure the material has a place to go in the mixer. Similarly, in a purging operation, air is injected by the air lance 192 in order to insure that the flow conduit 18 and injector system 160 are fully purged of material ready for the next startup.

The material injector system 160 insures that the additional flow of material metered into the process by the transport system 10 are properly and smoothly fed into the material carried into the mixing chamber 96 of the remotely located mixer 16. A smooth blending of materials into the process is provided by the injector system 160.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A system for transporting solid particulate material from a source of supply to a using apparatus at a location remote therefrom comprising: metering means for feeding material from said source into a receiver having an outlet; elongated conduit means interconnecting said outlet and said apparatus at said remote location for containing a fluidized flow of said material; fluid injector means for moving material from said receiver through said conduit means in a fluidized flow and control means responsive to the operative condition of said using apparatus for maintaining said fluid injector means in operation for a selected time interval after said apparatus is inoperative to purge said receiver and conduit means of material with said fluid.

2. The system of claim 1 wherein said metering means comprises a rotating feeder having a continuing fluid seal between said source of supply and said receiver to prevent flow of fluid from said injector means back toward said source of supply of material.

3. The system of claim 1 wherein said apparatus includes a drive motor and said control means includes valve means movable between a normal, operative position directing pressurized fluid into said injector means from a source thereof and an alternate purge position in response to the deactivation of said drive motor, and fluid operated timer means interconnected between said valve means in said alternate position and said fluid injector means for supplying purging fluid to said receiver and fluid conduit means for a selected time period after movement of said valve means into said alternate position.

4. In combination, a system for transporting solid particulate material from a source of supply of said material to a remote location and a material processing apparatus at said location for receiving said material; said system comprising metering means for feeding material from said source into a receiver including an outlet; elongated conduit means interconnecting said outlet and said material processing apparatus for containing a fluidized flow of said material; fluid injector means for moving material from said receiver through said conduit means toward said material processing apparatus and control means responsive to the operative condition of said material processing apparatus for maintaining said fluid injector means in operation for a selected time interval after said apparatus is inoperative to purge said receiver and conduit means of material with said fluid.

5. The combination of claim 4 wherein said control means includes valve means movable between a normal, operative position directing pressurized fluid from a source thereof into said fluid injector means and an alternate purge position; a fluid operated timer interconnected between said valve means in said purge position and said fluid injector means for providing a flow of purging fluid for a selected time interval after movement of said valve means to said purge position; and sensing means responsive to the operation of said apparatus for causing said valve to move to said purge position.

6. The combination of claim 5 wherein said apparatus includes an electric drive motor and said valve means includes a solenoid control; said sensing means operatively interconnecting said drive motor and solenoid to cause the latter to permit said valve means to move to said purge position on de-energization of the former.

7. The combination of claim 4 including material injection means on said apparatus for receiving material from said conduit means and injecting the same into said apparatus.

8. The combination of claim 7 wherein said material process apparatus includes a mixing chamber with an upstanding side wall and a rotary mixer mounted in said chamber for moving process material around said sidewall; said material injection means including a housing mounted on said sidewall having an opening facing generally in the direction of movement of said process material along said sidewall, said housing including a deflector wall forming an edge of said opening and positioned to divert said moving process material away from said sidewall to provide an open space in said process material in front of said opening, inlet means in said housing for receiving said fluidized flow of material from said conduit means, and second fluid injector means extending toward and aligned with said opening for moving said fluidized particulate material out through said opening into said open space created in said process material in said mixing chamber.

9. The combination of claim 8 including fluid conduit means for supplying fluid for said second fluid injector means from said first mentioned fluid injector means.

10. The combination of claim 8 wherein said second fluid injector means is aligned toward said opening in said housing.

11. A system for injecting particulate material into process material contained in a mixing chamber having a sidewall and mixing means for moving said process material along said sidewall comprising an injector housing mounted on said sidewall having an outlet opening facing generally in the direction of movement of said process material along said sidewall, said housing including a deflector wall forming an edge of said opening and positioned to divert said moving process material inwardly away from said sidewall to provide an open space in said process material in front of said opening, inlet means in said housing for receiving said particulate material, and fluid injector means extending toward and aligned with said opening for moving said particulate material out through said opening into said open space created in said process material in said mixing chamber.

12. The system of claim 11 wherein said deflector wall includes a first upright end adjacent said sidewall and a second upright end spaced from said first in the direction of said process material movement and defining an edge of said opening spaced inwardly away from said sidewall.

13. The system of claim 11 wherein said fluid injector means includes a fluid outlet spaced between said second upright end and said sidewall.

14. The system of claim 13 including valve means for regulating the fluid injected by said second injector means.

* * * * *